US006757150B2

(12) United States Patent
Gorczyca et al.

(10) Patent No.: US 6,757,150 B2
(45) Date of Patent: Jun. 29, 2004

(54) METHOD AND AIR BAFFLE FOR IMPROVING AIR FLOW OVER IONIZING PINS

(75) Inventors: John Gorczyca, Lansdale, PA (US); Michael Jacobs, Lansdale, PA (US)

(73) Assignee: Illinois Tool Works Inc., Glenview, IL (US)

( * ) Notice: Subject to any disclaimer, the term of this patent is extended or adjusted under 35 U.S.C. 154(b) by 525 days.

(21) Appl. No.: 09/897,371

(22) Filed: Jul. 3, 2001

(65) Prior Publication Data

US 2004/0012909 A1 Jan. 22, 2004

Related U.S. Application Data

(60) Provisional application No. 60/254,088, filed on Dec. 8, 2000.

(51) Int. Cl.[7] ................................................ H01G 23/00

(52) U.S. Cl. ...................................................... 361/231

(58) Field of Search ................................ 361/231, 230, 361/233

(56) References Cited

U.S. PATENT DOCUMENTS 5,055,963 A 10/1991 Partridge
5,249,094 A 9/1993 Hayakawa et al.
5,508,880 A 4/1996 Beyer
5,535,089 A * 7/1996 Ford et al. .................. 361/231
5,973,905 A 10/1999 Shaw
6,118,645 A 9/2000 Partridge

FOREIGN PATENT DOCUMENTS

FR 2 085 510 A 12/1971
GB 1 305 382 A 1/1973

OTHER PUBLICATIONS

European Search Report for EP Application No. 01124197.3, mail date: Feb. 21, 2002, 3 pages.

* cited by examiner

*Primary Examiner*—Stephen W. Jackson
*Assistant Examiner*—James Demakis
(74) *Attorney, Agent, or Firm*—Akin Gump Strauss Hauer & Feld, LLP

(57) ABSTRACT

A method of facilitating the transfer of ions from at least one ionizing pin disposed in an ion air blower into an air stream while the ion air blower is activated. The method includes attaching a baffle to the ion air blower; and positioning the baffle upstream from and proximate to the at least one ionizing pin to cause turbulent flow in the air stream proximate to the tip of the at least one ionizing pin. An ion air blower is also detailed herein. The air blower includes an emitter assembly disposed in a housing. A plurality of ionizing pins extend from the emitter assembly such that the air stream passes over the plurality of ionizing pins. A baffle is disposed proximate to and upstream from the ionizing pins to create turbulent flow in the air stream proximate to a tip of each of the ionizing pins.

19 Claims, 8 Drawing Sheets

Prior Art

METHOD AND AIR BAFFLE FOR IMPROVING AIR FLOW OVER IONIZING PINS

CROSS REFERENCE TO RELATED APPLICATIONS

This application claims the benefit of U.S. Provisional Application No. 60/254,088 entitled "METHOD AND AIR BAFFLE FOR IMPROVING AIR FLOW OVER IONIZING PINS," filed Dec. 8, 2000.

BACKGROUND OF THE INVENTION

The present invention is directed to ion generators and, more specifically, to a method and air baffle for creating air flow patterns proximate to the tips of ionizing pins which facilitates the transfer of ions from the tips of the ionizing pins into the airflow.

In many manufacturing and processing environments, it is desirable to prevent the accumulation of charge within a workspace. To prevent the accumulation of charge both positive and negative ions are guided into the workspace to neutralize any charge which may be building up. One example of an industry in which the accumulation of charge in production areas must be avoided is the disk drive industry where it is critical to maintain high manufacturing yields.

One important factor in ion generation is how rapidly ions can be transferred from the tip of an ionizing pin into an air stream. Referring to FIG. 1, an emitter assembly 10' commonly used in ion air blowers is shown. The emitter assembly 10' is mounted so that air is propelled through an air guide 30' which is formed by an annular ring 22'. Ionizing pins 32' extend generally radially inwardly from the annular ring 32' so that their tips are positioned in the air flow to allow ions to be blown off or drawn off of the ionizing pins 32' and out of the ion air blower (not shown) which houses the emitter assembly 10'. It is common to use a fan (not shown) to drive or draw air through the air guide 30'. One drawback of the emitter assembly 10' is that the air that is driven or drawn over the tips of the ionizing pins 32' tends to have a relatively laminar flow characteristic that is less efficient at stripping ions from the tips of the ionizing pins 32'.

What is needed, but so far not provided by the conventional art, are a method and an air baffle for improving the air flow over ionizing pins to increase the rate at which ions are stripped from the tips of ionizing pins.

BRIEF SUMMARY OF THE PRESENT INVENTION

One embodiment of the present invention is directed to a method of facilitating the transfer of ions from at least one ionizing pin disposed in an ion air blower into an air stream while the ion air blower is activated. The ion air blower has an air intake and an air exhaust. The air stream enters the ion air blower through the air intake, passes over at least a tip of the at least one ionizing pin, and is ejected from the ion air blower via the air exhaust while the ion air blower is activated. The method includes attaching a baffle to the ion air blower; and positioning the baffle upstream from and proximate to the at least one ionizing pin to interrupt the air stream causing turbulent flow in the air stream proximate to the tip of the at least one ionizing pin. The turbulent flow of the air stream over the tip of the at least one ionizing pin facilitates the removal of ions from the at least one ionizing pin. This configuration also benefits the intermixing of the ions in the air stream resulting in a homogenous cloud of positive and negative ions.

The present invention is alternatively directed to an ion air blower including a housing capable of guiding an air stream passing therethrough. An emitter assembly is disposed in the housing. A plurality of ionizing pins extend from the emitter assembly such that the air stream passes over the plurality of ionizing pins. A baffle is disposed on the housing proximate to and upstream from the plurality of ionizing pins and is capable of interrupting the air stream. The baffle creates turbulent flow in the air stream proximate to a tip of each of the plurality of ionizing pins.

BRIEF DESCRIPTION OF THE SEVERAL VIEWS OF THE DRAWINGS

The following detailed description of the preferred embodiments of the present invention will be better understood when read in conjunction with the appended drawings. For the purpose of illustrating the invention, there are shown in the drawings embodiments which are presently preferred. It is understood, however, that the invention is not limited to the precise arrangements and instrumentalities shown.

In the drawings.

DETAILED DESCRIPTION OF THE INVENTION

Figure 1:
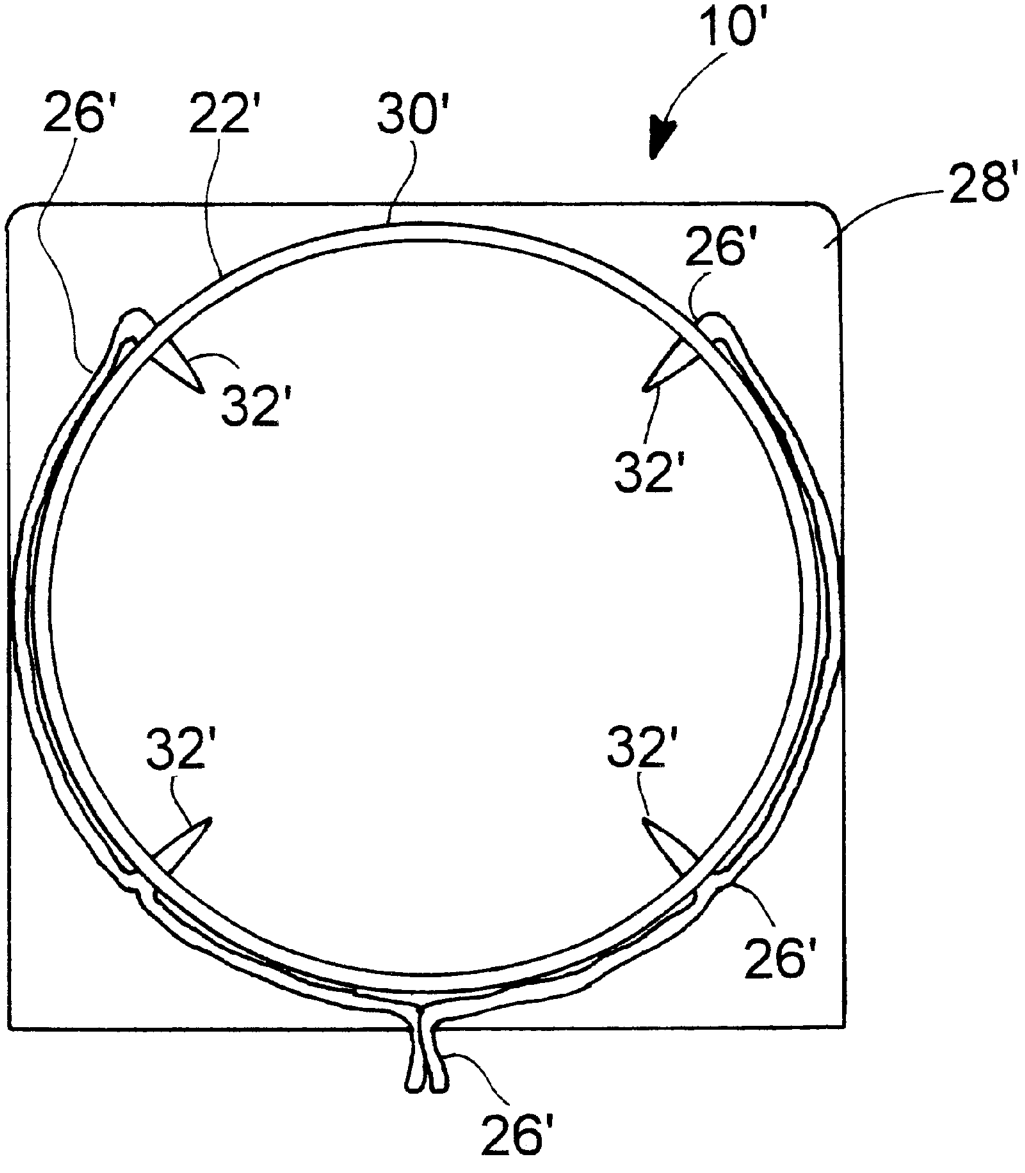
FIG. 1 is a rear elevation view of a prior art emitter assembly.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the air baffle and designated parts thereof. The terminology includes the words above specifically mentioned, derivatives thereof and words of similar import. Additionally, the word "a," as used in the claims and in the corresponding portions of the specification, means "at least one."

Referring to the drawings in detail, wherein like numerals represent like elements throughout, there is shown in FIGS. 6–9 a preferred method of improving the airflow over ionization pins using one of three preferred embodiments of an air baffle, generally designated 100, 100', 100". Briefly speaking, referring to FIG. 9, the method of the present invention facilitates the transfer of ions from at least one ionizing pin 32 disposed in an ion air blower 118 into an air stream 116 while the ion air blower 118 is activated. The ion air blower 118 has an air intake 122 and an air exhaust 124. The flow of air 116 enters the ion air blower 118 through the air intake 122, passes over at least the tip 106 of the at least one ionizing pin 32, and is ejected from the ion air blower 118 via the air exhaust 124 while the ion air blower 118 is activated. The method preferably includes attaching a baffle 100, 100', 100" to the ion air blower 118 and positioning the baffle 100, 100', 100" upstream from and proximate to the at least one ionizing pin 32 to interrupt the air stream 116 causing turbulent flow 104 in the air stream 116 proximate to the tip 106 of the at least one ionizing pin 32. The turbulent flow 104 of the air stream 116 over the tip 106 of the at least one ionizing pin 32 facilitates the removal of ions from the at least one ionizing pin 32. The turbulent flow 104 is caused when air curls around the upper edge 102 of the air baffle 100, 100', 100" and creates turbulent airflow 104 in the area of the tip 106 of the ionizing pin 32. The turbulent air strips ions from the tip 106 of the ionizing pin 32 more effectively than otherwise possible and improves emitter efficiency. The proper placement of the air baffle 100 of the present invention improves the responsiveness of an ion air blower which increases the responsiveness of a feedback control loop (further discussed below) used to balance the emitter assembly 10. Thus, the air baffle 100 improves the performance of both AC and DC ion air blowers.

Figure 6:
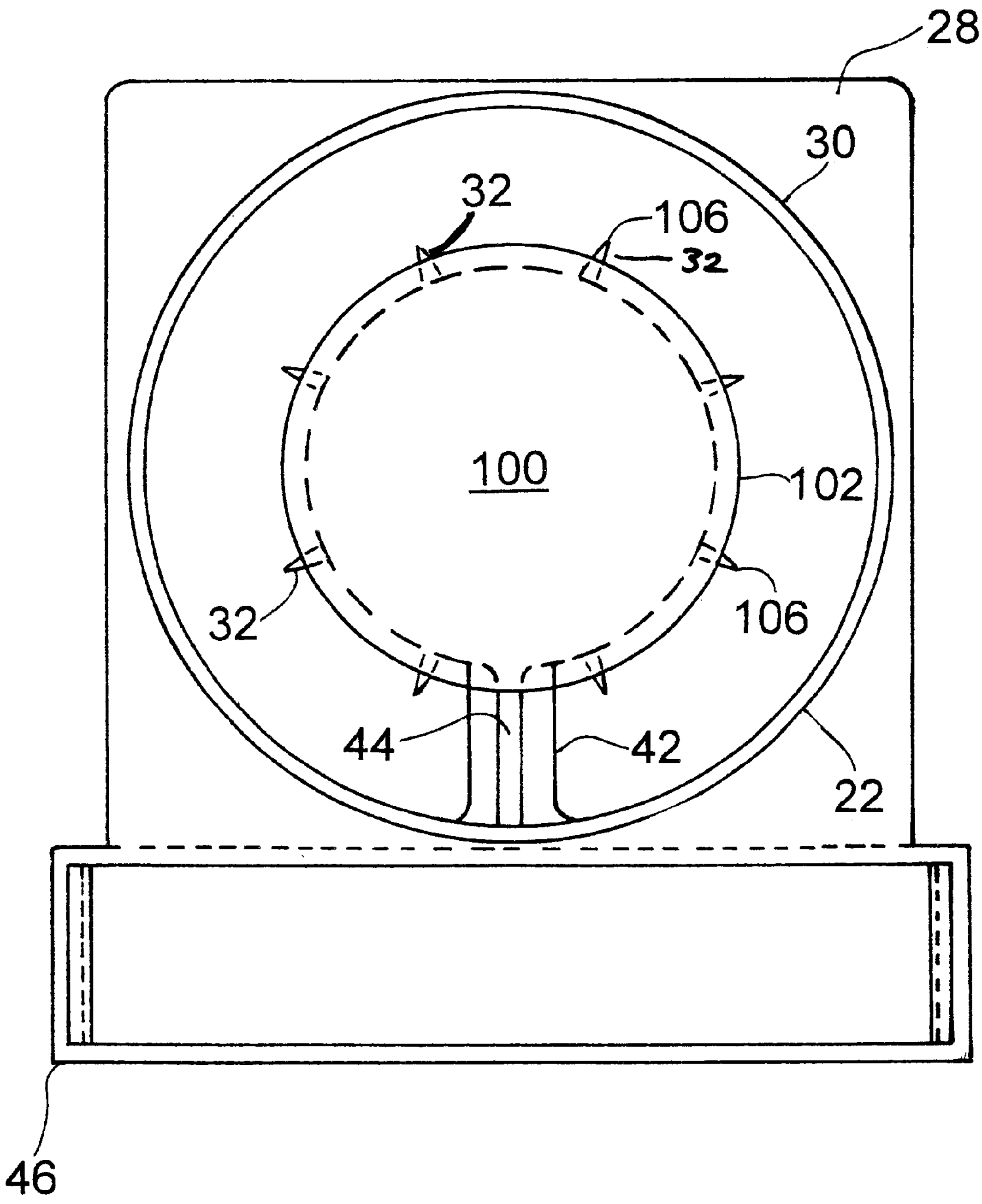
FIG. 6 is a rear elevation view of the emitter assembly of FIG. 3 modified to include the first preferred embodiment of the air baffle of the present invention.
Figure 7:
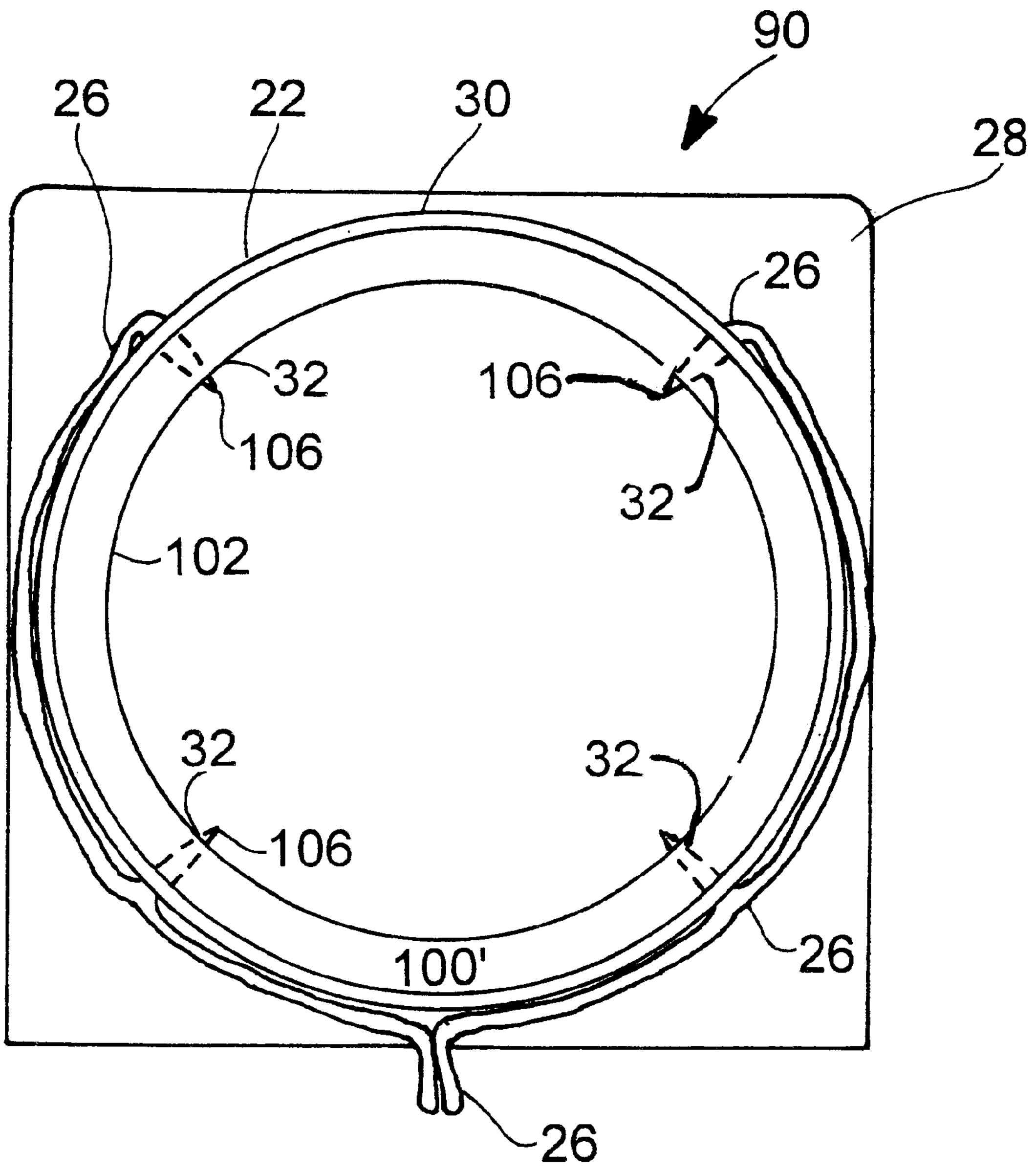
FIG. 7 is a rear elevation view of a second preferred embodiment of an emitter assembly using a second preferred embodiment of the air baffle of the present invention.
Figure 8:
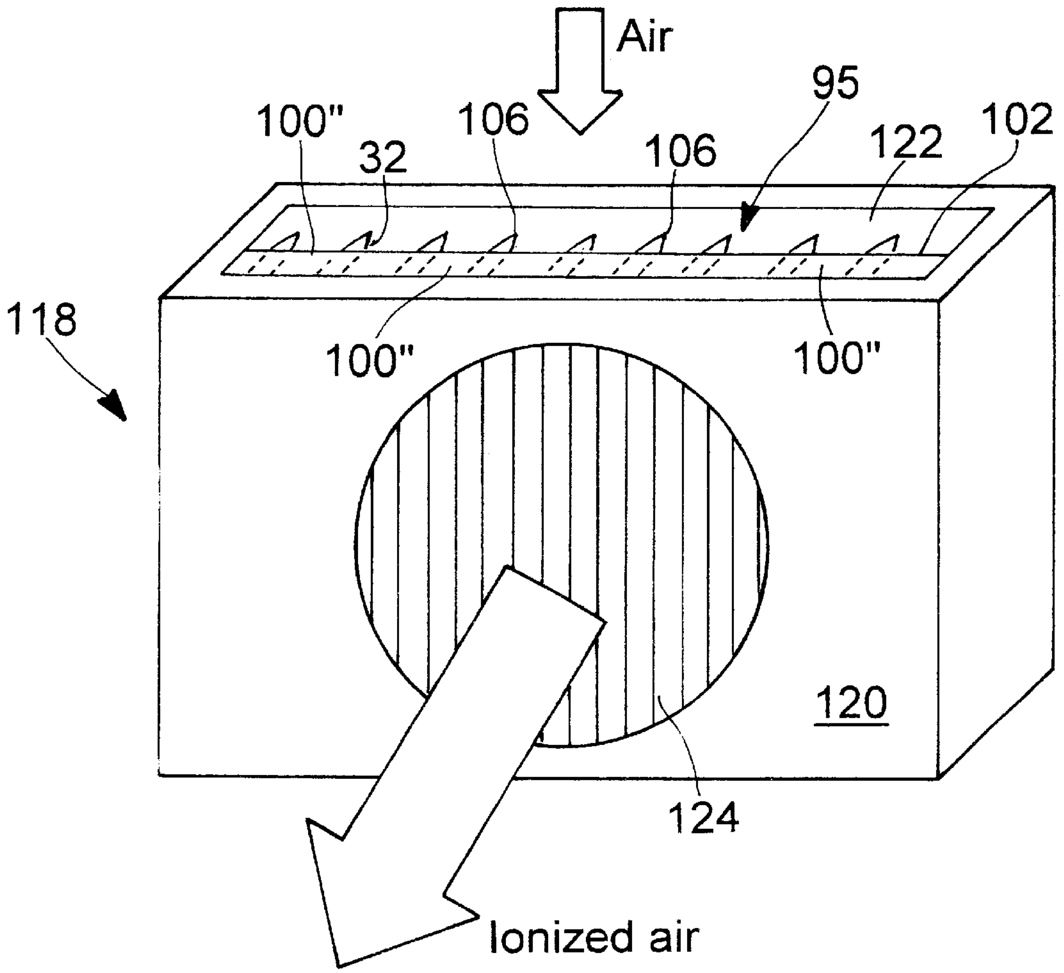
FIG. 8 is a perspective view of a third preferred embodiment of an emitter assembly using a third preferred embodiment of the air baffle of the present invention.

FIGS. 6–8 also illustrate an ion air blower 118 having an air baffle 100, 100', 100" in accordance with the preferred embodiments of the present invention. Briefly speaking, the ion air blower 118 includes a housing 120 capable of guiding a flow of air 116 passing therethrough. An emitter assembly 10 is disposed in the housing. A plurality of ionizing pins 32 extend from the emitter assembly 10 such that the air stream passes over the plurality of ionizing pins 32. The baffle 100 is disposed on the housing 120 proximate to and upstream from the plurality of ionizing pins 32 and is capable of interrupting the flow of air. The baffle 100 creates turbulent flow 104 in the flow of air proximate to the tip 106 of each of the plurality of ionizing pins 32.

FIGS. 2A–5 illustrate a first preferred embodiment of an emitter assembly 10 that can be used with the air baffle 100 of the present invention. Briefly speaking, referring to FIG. 3, the emitter assembly 10 has a cylindrical outer surface with a plurality of ionizing pins 32 extending generally radially outwardly from the cylindrical outer surface. As further detailed below, the generally outwardly orientation of the ionizing pins 32 allows for the increased miniaturization of an ion air blower using the emitter assembly 10. Additionally, the structure of the annular assembly ring 34 is readily producible using a minimum amount of tooling and processing steps. FIG. 7 illustrates a second preferred embodiment of an emitter assembly 90 for use with the second preferred embodiment of the air baffle 100' of the present invention. FIG. 8 illustrates a third preferred embodiment of an emitter assembly 95 for use with the third preferred embodiment of the air baffle 100" of the present invention. The present invention includes using an air baffle with any emitter assembly regardless of the geometric configuration of the emitter assembly used with an ion air blower. Additionally, the air baffle of the present invention can be used with any emitter assembly regardless of how air is driven or drawn through the system.

Unless otherwise stated, the air baffle 100, 100', 100" and the emitter assembly 10, 90, 95 and its various components are preferably formed from a relatively durable, non-conductive material, such as acrylonitrile butadiene styrene ("ABS") or the like. The present invention includes the use of any non-conductive material or any conductive material to form the emitter assembly. It is preferred, but not necessary, that the ionizing pins 32 be formed of machined tungsten.

Figure 4:
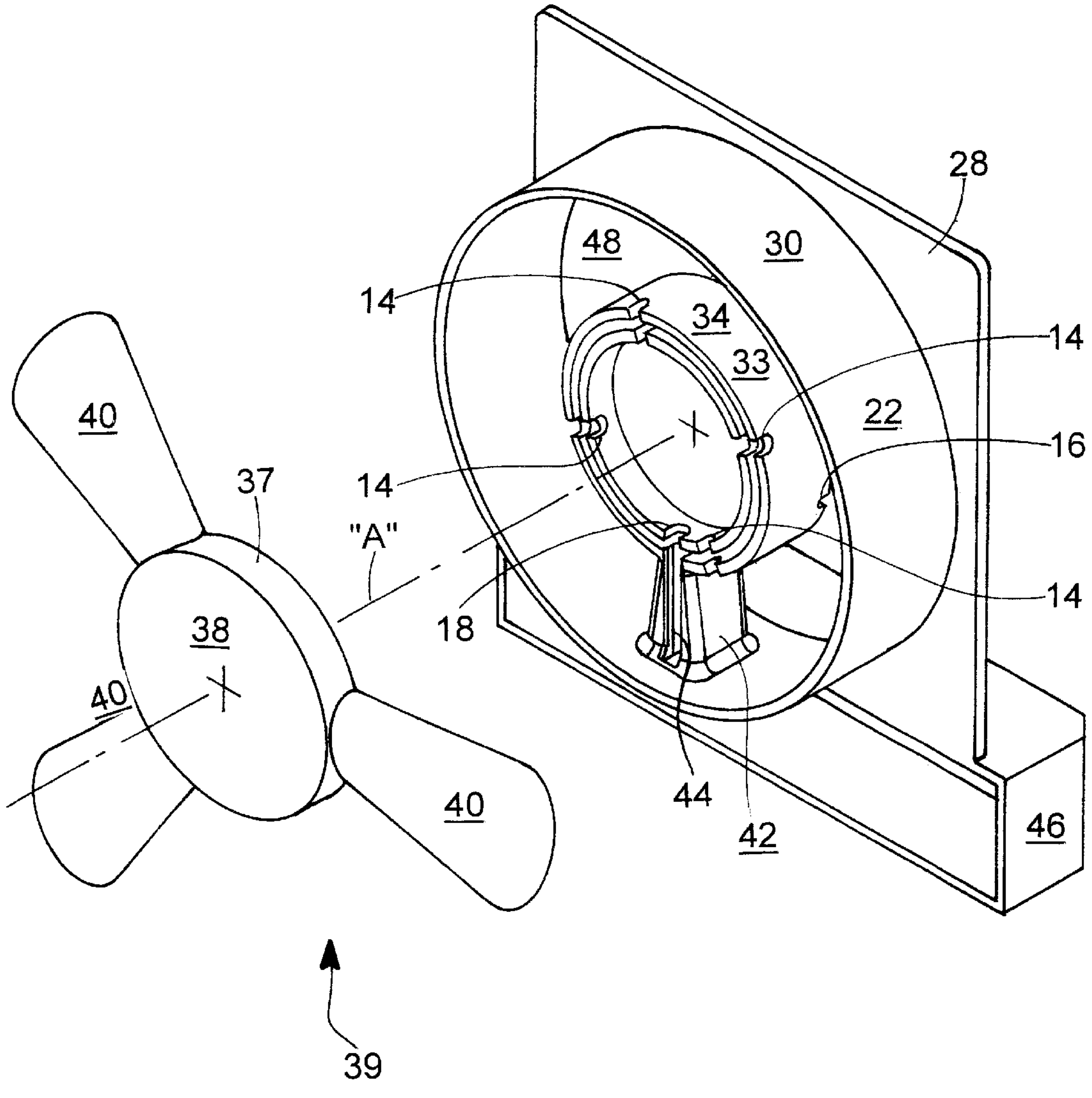
FIG. 4 is a rear perspective view of the annular ring of FIG. 2A mounted on a mounting plate for generally centrally aligning the emitter assembly with a fan.

The emitter assemblies 10, 90, 95 of the present invention are preferably, but not necessarily, used as part of an ion air blower and are preferably contained inside of an ion air blower housing 120 (an ion air blower housing 120 is only shown in FIG. 8 for the third preferred embodiment of the emitter assembly 9). Referring to FIG. 4, it is preferred that a fan 39 is disposed in the housing 120. The fan 39 includes a fan hub 38 having a peripheral surface and a plurality of fan blades 40 disposed along and extending from the peripheral surface. The fan is used to force or draw air over the ionizing pins 32. The fan 39 preferably has a separate housing, or mounting unit, (not shown) that is secured within the ion air blower housing. The fan 39 is preferably, but not necessarily, mounted so that the peripheral surface of the fan hub 38 and the cylindrical outer surface of the emitter assembly 10 are generally co-aligned (as shown by the alignment axis "A") to place the tip 106 of each of the plurality of ionizing pins 32 in the fastest portion of the air stream generated by the fan 39. The specific type of fan 39 used with the emitter assembly 10 is not critical to the present invention and, accordingly, further details regarding the fan 39 are neither recited nor necessary. While the emitter assembly 34 is described as being attached to a mounting plate 28 (further described below) for purposes of positioning the emitter assembly 10 within a specific type of ion air blower, the first preferred embodiment of the emitter assembly 10 is independent from the specific mounting plate 28 described herein and can be used in a variety of applications or types of ion air blowers.

The emitter assemblies 10, 90, 95 are preferably used in conjunction with a voltage power supply (not shown). It is preferable, but not necessary, that the voltage power supply be supplied with electrical power conditioned at between about seventy (70 V) and about two hundred forty (240 V) volts AC at between about fifty (50 Hz) and about sixty (60 Hz) hertz. The voltage power supply can include a circuit, such as a transformer, capable of stepping up the voltage to between about five thousand (5 KV) and ten thousand (10 KV) volts AC at between about fifty (50 Hz) and about sixty (60 Hz) hertz. Alternatively, the voltage power supply can include a circuit, such as a rectifier that includes a diode and capacitor arrangement, capable of increasing the voltage to between about five thousand (5 KV) and ten thousand (10 KV) volts DC of both positive and negative polarities. In yet another embodiment, a voltage power supply may be used which is supplied with electrical power conditioned at about twenty-four (24 V) volts DC. The voltage power supply can include a circuit, such as a free standing oscillator which is used as an AC source to drive a transformer whose output is rectified, capable of conditioning the voltage to between about five thousand (5 KV) and ten thousand (10 KV) volts DC of both positive and negative polarities. The connection from the voltage power supply to the emitter assemblies 10, 90, 95 as well as the type of voltage supplied to the emitter assemblies 10, 90, 95 is further described below. The specifics of the particular voltage power supply used with the emitter assemblies 10, 90, 95 is not critical to the present invention and, accordingly, is not further detailed herein.

Figure 2A:
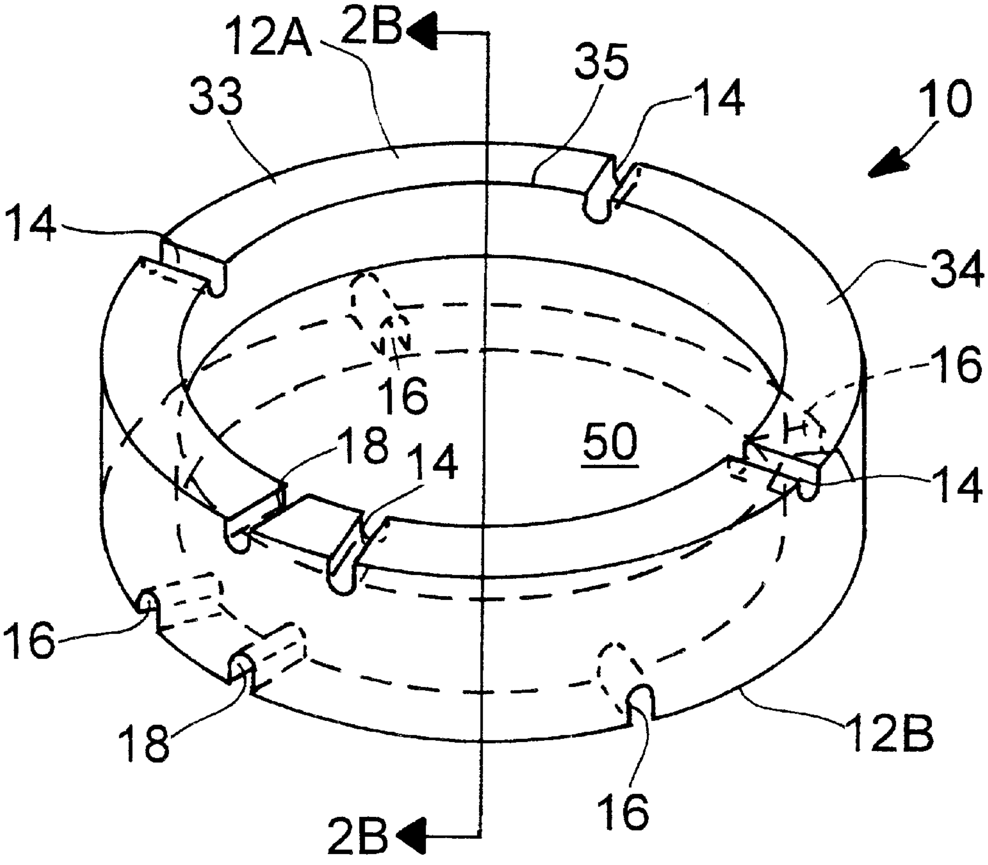
FIG. 2A is a perspective view of an annular assembly ring of the first preferred embodiment of an emitter assembly which can be used with a first preferred embodiment of an air baffle according to the present invention.
Figure 2B:
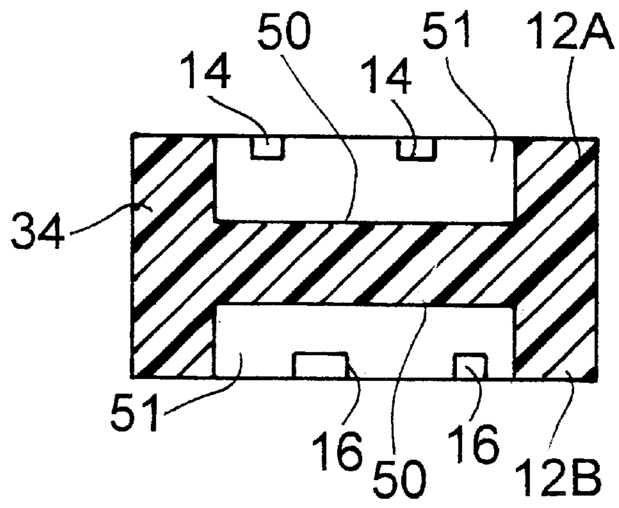
FIG. 2B is a cross-sectional view of the annular ring assembly of FIG. 2A as taken along the line 2B—2B of FIG. 2A.

Referring to FIGS. 2A and 2B, the annular assembly ring 34 of the first preferred embodiment of the emitter assembly 10 has a generally cylindrical shape having first and second major surfaces 12A, 12B on opposite ends of the annular assembly ring 34. The annular assembly ring 34 has hollows 51 formed in each end. A center portion 50 of the assembly ring 34, which is generally parallel to each of the first and second major surfaces 12A, 12B, separates the hollows 51. Each of the hollows 51 preferably has a generally cylindrical shape.

Figure 3:
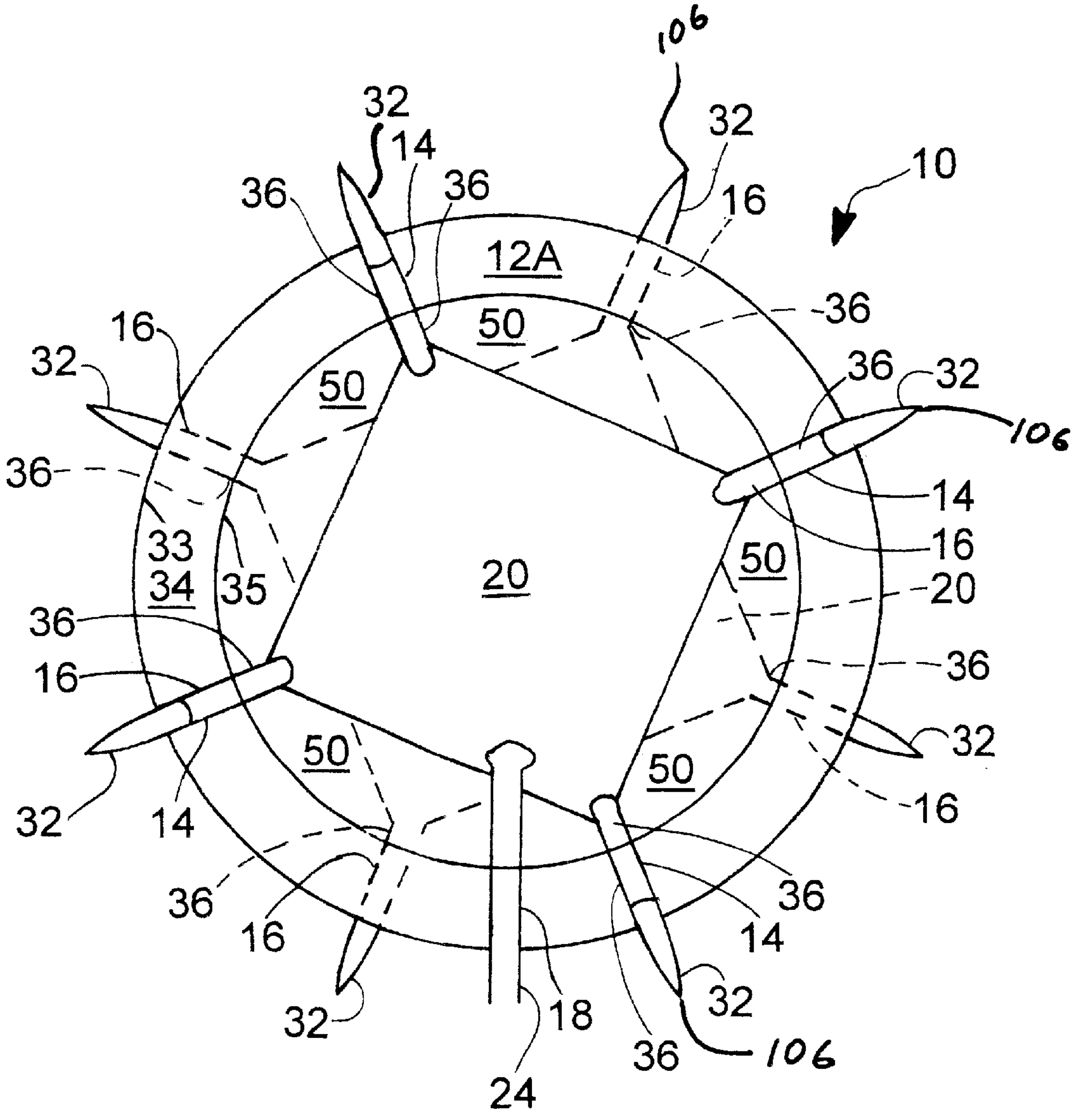
FIG. 3 is a rear elevation view of the first preferred embodiment of an emitter assembly for use with the air baffle of the present invention.

The first major surface 12A has a first set of socket grooves 14 placed therein for supporting ionizing pin sockets 14 (shown in FIG. 3). The first set of socket grooves 14 preferably, but not necessarily, have a cross-sectional area that is generally U-shaped. The present invention encompasses a first set of socket grooves 14 having a cross-sectional area that is rectangular, triangular, polygonal or the like. It is preferable that the first set of socket grooves 14 comprises four grooves spaced generally equidistantly along the first major surface 12A. However, the first major surface 12A may be designed to incorporate two (2), six (6), seven (7) or more grooves 14.

The second major surface 12B preferably, but not necessarily, has a second set of socket grooves 16 spaced generally equidistantly along the second major surface 12B. The present invention includes a second set of socket grooves 16 having two (2), six (6) or more grooves positioned along the second major surface 12B. It is preferred, but not necessary, that the second set of socket grooves 16 are offset from the first set of socket grooves 14 so that all of the ionizing pins 32 extend generally outwardly from the annular assembly ring 34 and are spaced generally equidistantly about the annular assembly ring 34. The annular assembly ring 34 may alternatively incorporate socket grooves 14, 16 that are not equidistantly positioned about the annular assembly ring 34. The shape of the second set of socket grooves 16 is preferably the same as that of the first set of socket grooves 14. Each of the socket grooves 14, 15 preferably extend from the outer surface 33 of the annular assembly ring through to the inner surface 35 of the hollow 51.

It is preferable, but not necessary, that one conduit groove 18 extend along each of the first and second major surfaces 12A, 12B of the annular assembly ring 34. It is preferable that the conduit grooves 18 be generally vertically aligned (as viewed in FIG. 2A) with the conduit grooves 18 positioned one over the other. The conduit grooves 18 are used to allow power conduits 24 to traverse the annular assembly ring 34.

While it is preferable that the annular assembly ring 34 have a generally circular shape when viewed generally perpendicular to either the first or second major surface 12A, 12B, those of ordinary skill in the art will appreciate that the shape of the assembly 34 can be varied. For example, the assembly 34 can have a generally rectangular, triangular, polygonal shape or the like. However, as will become clearer below, the generally circular shape of the annular assembly ring 34 is ideal for use with fans 39 having a generally circular hub 38.

Figure 5:
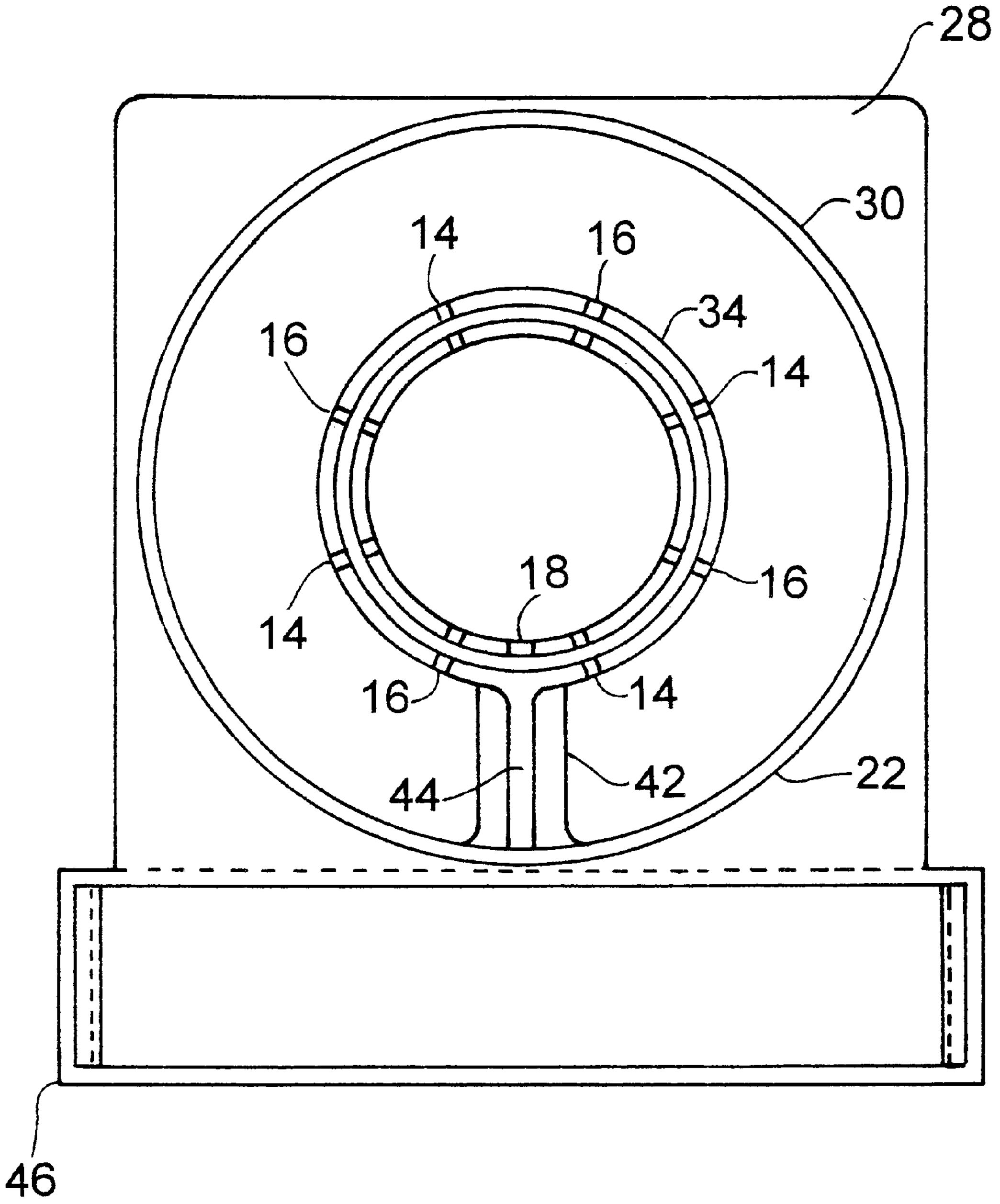
FIG. 5 is a rear elevation view of the annular ring and the mounting plate of FIG. 4.

Referring briefly to FIG. 3, the ionizing pins 32 extend generally radially outwardly from the annular ring assembly 34. Referring to FIGS. 4 and 5, the annular assembly ring 34 is preferably mounted in the ion air blower housing using a mounting plate 28. The mounting plate 28 preferably has a generally circular cutout 48 through which air is transported through the ion air blower. An air guide 30 is preferably disposed within the housing 120 for guiding the air stream generated by the fan 39 over the emitter assembly 10. The air guide 30 extends generally rearwardly along the perimeter of the generally circular cutout 48. The air guide 30 preferably has a generally hollow cylindrical shape which forms an annular ring 22. The first preferred embodiment of the annular assembly ring 34 may incorporate air guides 30 having other shapes and geometries.

The emitter assembly 10 is preferably, but not necessarily, disposed within the air guide. A stem 42 preferably extends generally radially inwardly from an inner surface of the air guide 30 to support the annular assembly 10 spaced from the inner surface of the air guide 30. The air guide is preferably aligned generally centrally relative to the circular cutout 48. Thus, the annular assembly ring 34 of the emitter assembly 10 is preferably positioned generally concentrically within the air tube 30. The stem 42 preferably has a generally trapezoidal shape and extends from an inner surface of the air guide 30 generally radially inwardly to connect to an outer surface 33 of the annular assembly ring 34. The stem 42 preferably has a pair of conduit slots 44 extending generally vertically along the stem 42. The conduit slots 44 preferably have a generally rectangular shape for receiving power conduits 24. The conduit slots 44 are preferably aligned with the conduit grooves 18 in the annular assembly ring 34 to provide a channel for power conduits 24 to extend through to an electrical connector(s) 20 (further described below) within the emitter assembly 10.

While the annular assembly ring 34, the stem 42, the air guide 30 and the mounting plate 42 are referred to as separate components above, the annular assembly ring 34 may be integrally formed using injection molding or the like. Alternatively, the various components of the annular assembly ring 34 can be formed of separate materials when the various components are individually assembled. It is preferable, but not necessary, that a compartment 46 be formed along the lower edge of the mounting plate 28. The compartment is preferably for housing the voltage power supply.

It is preferable that an inner diameter of the air guide 30 be generally the same diameter of the area swept out by the fan blades 40 of the fan 39. This results in the most efficient transfer of air through the air guide 30. It is also preferable, but not necessary, that the annular assembly ring 34 be sized so that the outer surface 33 of the annular assembly ring 34 is generally aligned with the outer edge 37 of the fan hub 38. Thus, the entire area swept out by the fan blades 40 for propelling air through the air chute 30 is generally equal to the area between the inner surface of the air guide 30 and the outer surface 33 of the annular assembly ring 34.

As best shown in FIG. 3, the wiring of the emitter assembly 10 is accomplished using sockets 36 that are directly attached to an electrical connector 20 that is contained within the annular assembly ring 34. This wiring structure is much simpler than that of the prior art (shown in FIG. 1) and allows the housing of the ion air blower to be miniaturized to the same general size as that of the fan housing (not shown). The spacing between the air guide 30 and the emitter assembly 10 is preferably sufficient to prevent arcing and unwanted leakage between the wiring and ionizing pins 32 of the emitter assembly 10 and the ion air blower housing and also facilitates the use of a metal housing, for grounding purposes, which in turn reduces the generation of electromagnetic interference (EMI).

It preferable, but not necessary, that two electrical connectors 20 are positioned within the annular assembly ring 34. Each electrical connector is preferably positioned on the central portion 50 that forms a bottom of each hollow 51. Each electrical connector 20 preferably has sockets 36 directly attached for receiving ionizing pins 32. The electrical connector 20 receives power through the power conduits 24 and transfers the power to the ionizing pins 32, via the sockets 36, to produce ions. As the sockets are preferably generally rigidly attached to the electrical connectors 20, the electrical connectors 20 are easily inserted in the hollows 51 by aligning the sockets 36 with a set of socket grooves 14, 16.

Each socket 36 preferably receives an ionizing pin 32 which extends generally radially outwardly therefrom. As mentioned above, the power conduits 24 extend through the conduit grooves 18 to supply power to the ionizing pins 32 via the electrical connector 20. The second electrical connector 20 is preferably positioned on the opposite side of the central portion 50 of the annular assembly ring 34 in the remaining hollow 51. The second electrical connector 20 is similarly connected to ionizing pins 32 using sockets 36 that are directly attached to the electrical connector.

It is preferable, but not necessary, to use two separate electrical connectors 20 when operating the emitter assembly using DC voltage. The use of two electrical connectors allows one set of pins 32 to be operated at a negative voltage and a second set of pins to be operated at a positive voltage. This is necessary to generate both positive and negative ions on the tips 106 of the ionizing pins 32. The use of two electrical connectors 20 can create a capacitance that reduces the noise of the emitter assembly 10. Alternatively, AC voltage can be used with both electrical connectors 20 to cause all of the ionizing pins 32 to alternately emit positive and negative ions. The first preferred embodiment of the emitter assembly 10 can incorporate a single electrical connector 20 to drive all the ionizing pins 32 by using AC power to generate both positive and negative ions.

It is preferred that the sockets are held in their respective grooves 14, 16 by placing a circular plate (not shown) over each end of the annular assembly ring 34 and fixing the plates thereto. Once the plates are in position, the sockets are firmly held in position. The present invention includes other methods of securing the sockets in their respective grooves, such as sealing each socket in place with additional ABS material or the like.

The electrical connectors 20 with attached sockets 36 can be separately manufactured from the annular assembly ring 34 and easily inserted in place. Thus, the first preferred embodiment of emitter assembly 10 is readily assembled and positions all of the wiring inside of the annular assembly ring 34 to facilitate the miniaturization of the ion air blower using the emitter assembly 10.

Alternatively, the electrical connectors 20 can be manufactured on a nonconductive sheet of material (not shown) which is inserted into the annular assembly ring 34 to create an interference friction fit. The present invention also includes using generally rigid conductive wiring to attach the electrical connectors 20 to the sockets 36.

Referring to FIG. 6, the first preferred embodiment of the air baffle 100 is preferably disposed on an upstream side of the emitter assembly 10 and extends generally radially outwardly to interrupt the flow of air and to create turbulent flow in the flow of air proximate to the tip 106 of each of the plurality of ionizing pins 32. It is preferable, but not necessary, that the method of the present invention include the step of attaching a baffle having a generally circular disk shape proximate to the at least one ionizing pin 32. It is preferable, but not necessary, that the air baffle 100 is generally concentrically aligned with the outer edge 33 of the annular assembly ring 34 and is disposed on an end of the annular assembly ring 34 opposite from the mounting plate 34. The air baffle 100 is preferably generally disk shaped and has a circumference which preferably extends slightly beyond the outer surface 33 of the annular assembly ring 34. The air baffle 100 can be integrated with the circular plate that is used to secure the sockets 36 in their respective grooves 14. The perimeter of the air baffle 100 preferably extends past the outer edge of the annular assembly ring 34 by an amount slightly less than the distance that the tips 106 of the emitter pins 32 extend past the outer surface 33 of the annular assembly ring 34.

Figure 9:
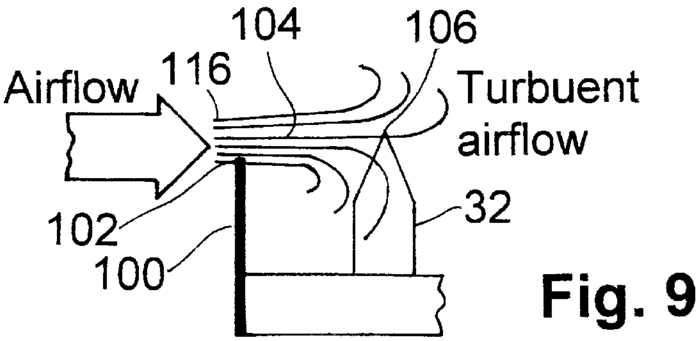
FIG. 9 is a partial side elevational view of the air baffle of FIG. 6 illustrating how the proper placement of the air baffle generates turbulent airflow proximate to a tip of an ionizing pin.

Referring to FIG. 9, the configuration of the air baffle 100 creates turbulent airflow 104 in the area of the tip 106 of the ionizing pin 32 that facilitates the removal of ions from the ionizing pin 32. The present invention includes an air baffle 100 that is uneven relative to the circumference of the annular assembly ring 34. Accordingly, the air baffle 100 of the present invention can be perforated, segmented in areas or otherwise discontinuous.

Referring to FIG. 7, a second preferred embodiment of the air baffle 100' is positioned on a second preferred embodiment of the emitter assembly 90 which preferably has a hollow cylindrical shape for the flow of air to pass through. The emitter assembly 90 has an inner surface bearing a plurality of ionizing pins 32 extending generally radially inwardly. The air baffle 100' is preferably disposed on the emitter assembly 90 and has an annular ring shape. The baffle extends from the inner surface of the emitter assembly 90 generally radially inwardly. The emitter assembly is preferably attached to or formed on the end of the air guide 30 opposite from the mounting plate 28. The inner perimeter of the air baffle 100' extends inwardly slightly less than the distance that the tips 106 of the emitter pins 32 extend inwardly from the annular assembly ring 90. The configuration of the air baffle 100' creates turbulent airflow 104 in the area of the tip 106 of the ionizing pin 32 that facilitates the removal of ions from the ionizing pin 32. The extent to which the air baffle 100' extends inwardly represents a trade off between creating back pressure in the ion air blower and increasing the removal of ions from the ionizing pins 32. When using the second preferred embodiment of the air baffle 100' with the method of the present invention, the method preferably includes attaching an annular ring shaped baffle 100' proximate to the at least one ionizing pin 32.

Referring to FIG. 8, a third preferred embodiment of an air baffle 100" is positioned on a third preferred embodiment of an emitter assembly 95. The housing 120 of the ion air blower is generally rectangularly shaped and has a slot, forming an air intake, through which any flow of air passing through the housing is drawn. The emitter assembly preferably has a generally linear shape and is positioned proximate to the slot. The plurality of ionizing pins 32 extend from the emitter assembly 90 and extend at least partially across the slot. The air baffle 100" preferably has a generally rectangular shape and is positioned across a portion of the slot. The air baffle 100" extends laterally from an edge of the ion air blower housing 120 to interrupt the flow of air before the air reaches the ionizing pins 32. The air baffle 100" extends laterally from the edge of the housing 120 by a distance less than the distance that the tips 106 of the ionizing pins 32 extend from the inner edge of the housing 120. The configuration of the air baffle 100" causes turbulent airflow 104 in the area of the tip 106 of the ionizing pin 32 that facilitates the removal of ions from the ionizing pin 32. When using the third preferred embodiment of the air baffle 100" with the method of the present invention, the method preferably includes attaching a generally rectangular shaped baffle 100" proximate to the at least one ionizing pin 32.

Referring to FIGS. 2A–6, one embodiment of the air baffle 100 of the present invention operates as follows. An emitter assembly 10 is positioned inside an ion air blower via a mounting plate 28. The preferably generally rectangular shaped mounting plate 28 is secured inside the housing and has a generally circular cutout 48 therein. Extending generally rearwardly around the perimeter of the generally circular cutout 48 is an air guide 30. The air guide 30 preferably has a generally cylindrical tubular shape. A fan is positioned adjacent to the air guide 30 to drive air through the air guide 30.

A stem 42 extends generally radially inwardly from an inner surface of the air guide 30 to support the annular assembly ring 34 in a position that is generally centrally aligned with the circular cutout 48. The sizing of the outer surface 33 of the annular assembly ring 34 is preferably generally equal to that of the hub 38 of the fan 39. Ionizing pins 32 extend from the outer surface 33 of the annular assembly ring 34 with the ionizing pin tips positioned in the air guide 30 proximate to the point of fastest airflow generated by the fan blades 40. This facilitates the stripping of ions from the ends of the ionizing pins 32 by the propelled air.

Each of the ionizing pins 32 is secured within a socket 36 that is located in one of the first or second sets of socket grooves 14, 16. Each socket 14 is preferably supported by its respective groove 14, 16 and is directly attached to an electrical connector 20 that is generally centrally positioned within the emitter assembly 10. Power is supplied to the electrical connector 20 via power conduit(s) 24 and is then transmitted via the sockets 36 to the individual ionizing pins 32. The voltage supplied to the pins causes corona onset to occur and ions are generated on the tips 106 of the ionizing pins 32. A generally circularly shaped air baffle 100 is mounted to the annular assembly ring 34 and is interposed between a portion of the ionizing pins 32 and the fan 39. Air is driven by the fan 39 past the air baffle 100 which causes the passing air to undergo turbulent flow while passing over the tips 106 of the ionizing pins 32 which increases the transfer of ions into the air. The preferably balanced positive and negative ions are then ejected by the ion air blower to prevent the build up of charge in a given area or clean room.

It is preferable, but not necessary, that a sensor (not shown) is positioned in the ion air blower adjacent to the emitter assembly 10 on a side opposite from the fan 39 to detect the level of ions in the air. A feedback circuit (not shown) is preferably used to automatically adjust the power transmitted to the ionizing pins 32 to adjust the level of ions contained in the air being ejected from the ion air blower. The increased response experienced by the emitter assembly 10 due to the air baffle 100 results in enhanced performance of the feedback loop.

In another similar embodiment of the air baffle 100 of the present invention, the fan is positioned adjacent to, but downstream relative to the flow of air, the air guide 30 to draw air through the air guide 30.

It is recognized by those skilled in the art, that changes may be made to the above-described embodiments of the invention without departing from the broad inventive concept thereof. It is understood, therefore, that this invention is not limited to the particular embodiments disclosed, but it is intended to cover all modifications which are within the spirit and scope of the invention as defined by the appended claims.

We claim:

1. A method of facilitating the transfer of ions from at least one ionizing pin disposed in an ion air blower into an air stream while the ion air blower is activated, the ion air blower having an air intake and an air exhaust, the air stream entering the ion air blower through the air intake, passing over at least a tip of the at least one ionizing pin, and being ejected from the ion air blower via the air exhaust while the ion air blower is activated, the method comprising:

attaching a baffle to the ion air blower; and positioning the baffle upstream from and proximate to the at least one ionizing pin to interrupt the air stream causing turbulent flow in the air stream proximate to the tip of the at least one ionizing pin wherein the turbulent flow of the air stream over the tip of the at least one ionizing pin facilitates the removal of ions from the at least one ionizing pin.

2. The method of claim 1 wherein the step of attaching the baffle comprises attaching an annular ring shaped baffle proximate to the at least one ionizing pin.

3. The method of claim 1 wherein the step of attaching the baffle comprises attaching a generally rectangular shaped baffle proximate to the at least one ionizing pin.

4. The method of claim 1 wherein the step of attaching the baffle comprises attaching a baffle having a generally circular disk shape proximate to the at least one ionizing pin.

5. An ion air blower, comprising:

a housing capable of guiding a flow of air passing therethrough;

an emitter assembly disposed in the housing;

a plurality of ionizing pins extending from the emitter assembly such that the flow of air passes over the plurality of ionizing pins; and a baffle disposed on the housing proximate to and upstream from the plurality of ionizing pins and capable of interrupting the air stream, wherein the baffle creates turbulent flow in the air stream proximate to a tip of each of the plurality of ionizing pins.

6. The ion air blower of claim 5 wherein the emitter assembly has a cylindrical outer surface, the plurality of ionizing pins extending generally radially outwardly from the cylindrical outer surface.

7. The ion air blower of claim 6 further comprising a fan disposed in the housing, the fan comprising a fan hub having a peripheral surface and a plurality of fan blades disposed along and extending from the peripheral surface.

8. The ion air blower of claim 7 further comprising an air guide disposed within the housing for guiding the air stream generated by the fan over the emitter assembly.

9. The ion air blower of claim 8 wherein the air guide has a generally hollow cylindrical shape.

10. The ion air blower of claim 9, wherein an inner diameter of the air guide is generally the same as a diameter of the area swept out by the fan blades of the fan.

11. The ion air blower of claim 8 wherein the emitter assembly is disposed within the air guide.

12. The ion air blower of claim 11 further comprising a stem extending generally inwardly from an inner surface of the air guide to support the emitter assembly spaced from the inner surface of the air guide.

13. The ion air blower of claim 7 wherein the peripheral surface of the fan hub and the cylindrical outer surface of the emitter assembly are generally co-aligned to place the tip of each of the plurality of ionizing pins in the fastest portion of the air stream generated by the fan.

14. The ion air blower of claim 6 wherein the baffle is disposed on an upstream side of the emitter assembly and extends generally radially outwardly to interrupt the air stream and to create turbulent flow in the air stream proximate to the tip of each of the plurality of ionizing pins.

15. The ion air blower of claim 5 wherein the housing has a slot through which any air stream passing through the housing is drawn.

16. The ion air blower of claim 15 wherein the emitter assembly has a generally linear shape and is positioned proximate to the slot, the plurality of ionizing pins extending from the emitter assembly and extending at least partially across the slot.

17. The ion air blower of claim 16 wherein the baffle has a generally rectangular shape and extends across a portion of the slot.

18. The ion air blower of claim 5 wherein the emitter assembly has a hollow cylindrical shape for the air stream to pass through, the emitter assembly having an inner surface bearing a plurality of ionizing pins extending generally radially inwardly.

19. The ion air blower of claim 18 wherein the baffle is disposed on the emitter assembly and has an annular ring shape, the baffle extending from the inner surface of the emitter assembly generally radially inwardly.

* * * * *